US009396263B1

(12) United States Patent
Unger et al.

(10) Patent No.: US 9,396,263 B1
(45) Date of Patent: Jul. 19, 2016

(54) IDENTIFYING CANONICAL CONTENT ITEMS FOR ANSWERING ONLINE QUESTIONS

(71) Applicant: Google Inc., Mountain View, CA (US)

(72) Inventors: Alexander Ketner Unger, San Francisco, CA (US); Frances Bordwell Haugen, Mountain View, CA (US); Kathryn Rose Vanderwater, Plainfield, IL (US)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 14/053,522

(22) Filed: Oct. 14, 2013

(51) Int. Cl.
*G06F 17/30* (2006.01)

(52) U.S. Cl.
CPC .... *G06F 17/30864* (2013.01); *G06F 17/30598* (2013.01)

(58) Field of Classification Search
CPC ................................ G06F 17/00; G06F 17/30
See application file for complete search history.

(56) References Cited

U.S. PATENT DOCUMENTS

| 5,802,493 | A  | * | 9/1998  | Sheflott ................... G06F 17/30 705/1.1 |
| 7,899,915 | B2 | * | 3/2011  | Reisman ........... G06F 17/30873 709/227 |
| 8,468,143 | B1 |   | 6/2013  | Oztekin et al. |
| 8,473,499 | B2 | * | 6/2013  | Song ...................... G06Q 50/10 706/20 |
| 8,660,849 | B2 | * | 2/2014  | Gruber ................ G06F 17/3087 340/988 |
| 8,670,979 | B2 | * | 3/2014  | Gruber ................ G06F 17/3087 704/10 |
| 8,676,937 | B2 | * | 3/2014  | Rapaport ............... H04L 51/32 709/219 |
| 8,935,192 | B1 |   | 1/2015  | Ventilla et al. |
| 2003/0004909 | A1 |   | 1/2003  | Chauhan et al. |
| 2007/0118399 | A1 | * | 5/2007  | Avinash ................ G06F 19/322 705/2 |
| 2010/0070554 | A1 |   | 3/2010  | Richardson et al. |
| 2010/0131265 | A1 |   | 5/2010  | Liu et al. |
| 2011/0106746 | A1 |   | 5/2011  | Ventilla et al. |
| 2011/0125734 | A1 | * | 5/2011  | Duboue ................... G09B 7/00 707/723 |
| 2012/0124478 | A1 | * | 5/2012  | King ................ G06F 17/30943 715/738 |
| 2012/0272164 | A1 |   | 10/2012 | Polonsky et al. |
| 2012/0290950 | A1 | * | 11/2012 | Rapaport ................ H04L 51/32 715/753 |
| 2013/0097178 | A1 | * | 4/2013  | Song ...................... G06Q 50/10 707/748 |
| 2013/0246327 | A1 |   | 9/2013  | Tabrizi |
| 2013/0297545 | A1 |   | 11/2013 | Bierner et al. |
| 2013/0297553 | A1 | * | 11/2013 | Bierner ................ G06N 99/005 706/52 |
| 2013/0297625 | A1 | * | 11/2013 | Bierner ............ G06F 17/30634 707/754 |
| 2014/0250134 | A1 |   | 9/2014  | Jones |

(Continued)

OTHER PUBLICATIONS

Atkinson, et al., "Evolutionary optimization for ranking how-to questions based on user-generated contents," Expert systems with Applications, Dec. 2013, vol. 40, No. 17, pp. 7060-7068.

(Continued)

*Primary Examiner* — Farhan Syed
(74) *Attorney, Agent, or Firm* — Fish & Richardson P.C.

(57) ABSTRACT

Methods relating to canonical content items are provided. An example method may include receiving an online question by an asking user. The method may further include identifying one or more topics of the received online question. The method may further include matching at least one canonical content item from a plurality of canonical content items to the received online question based on the identified one or more topics, wherein each canonical content item of the plurality of canonical content items is associated with a model explanation of a topic. In addition, the method may include providing the matched at least one canonical content item to the asking user. Systems and computer-readable media are also described.

18 Claims, 5 Drawing Sheets

(56) References Cited

U.S. PATENT DOCUMENTS

| | | | | |
|---|---|---|---|---|
| 2014/0344718 | A1* | 11/2014 | Rapaport | H04L 51/32 715/753 |
| 2014/0358928 | A1* | 12/2014 | Alkov | G06F 17/30705 707/738 |
| 2014/0359421 | A1* | 12/2014 | Allen | G06F 17/241 715/230 |
| 2014/0365502 | A1* | 12/2014 | Haggar | G06N 5/02 707/748 |
| 2015/0088906 | A1 | 3/2015 | Pal et al. | |
| 2015/0100509 | A1 | 4/2015 | Pappas et al. | |
| 2015/0120718 | A1 | 4/2015 | Luo et al. | |

OTHER PUBLICATIONS

Dror, et al., "I Want to Answer, Who Has a Question? Yahoo! Answers Recommender System," Aug. 2011, Proceedings of the 17th ACM SIGKDD International Conference on Knowledge Discovery and Data Mining, pp. 1109-1117.

John, et al., "What Makes a High-Quality User-Generated Answer?" IEEE Internet Computing, Jan./Feb. 2011, vol. 15, No. 1, pp. 66-71.

El-Korany, "Integrated Expert Recommendation Model for Online Communities," International Journal of Web & Semantic Technology, Oct. 2013, pp. 19-20, vol. 4, No. 4.

Liu, et al., "Finding Experts in Community-Based Question-Answering Services," CIKM '05, Oct. 31-Nov. 5, 2005, Bremen, Germany, 2 pages.

Riahi, et al., "Finding Experts in Community Question Answering," WWW 2012—CQA '12 Workshop, Apr. 16-20, 2012, Lyon, France, pp. 791-798.

White, et al., "Effects of Expertise Differences in Synchronous Social Q&A," SIGIR '12, Aug. 12-16, 2012, Portland, Oregon, 2 pages.

* cited by examiner

IDENTIFYING CANONICAL CONTENT ITEMS FOR ANSWERING ONLINE QUESTIONS

BACKGROUND

Online networks generally allow users to connect and share information with people in their network. In an online network, information or knowledge that is required to answer one user's question may have previously been asked and provided by other users. Certain users may not be fluent with certain technologies or online searching processes. It therefore may be desirable to provide users with a way to utilize the plethora of previously provided information in a prompt and accurate manner.

SUMMARY

The present disclosure relates generally to online queries, and more particularly to techniques related to online question answering using real-time network interaction technologies.

The disclosed subject matter relates to computer-implemented methods for providing canonical content items. An example method may comprise receiving an online question by an asking user. The method may further comprise identifying one or more topics of the received online question. The method may further comprise matching at least one canonical content item from a plurality of canonical content items to the received online question based on the identified one or more topics, wherein each canonical content item of the plurality of canonical content items is associated with a model explanation of a topic. In addition, the method may comprise providing the matched at least one canonical content item to the asking user.

The disclosed subject matter further relates to systems for providing canonical content items. An example system may comprise one or more processors, and a memory including instructions that, when executed by the one or more processors, cause the one or more processors to perform operations. The one or more processors of the system may be configured to receive an online question by an asking user. The one or more processors of the system may be further configured to identify one or more topics of the received online question. The one or more processors of the system may be further configured to match at least one canonical content item from a plurality of canonical content items to the received online question based on the identified one or more topics, wherein each canonical content item of the plurality of canonical content items is associated with a model explanation of a topic. In addition, the one or more processors of the system may be configured to provide the matched at least one canonical content item to the asking user.

The disclosed subject matter also relate to example machine-readable media comprising instructions stored therein, which when executed by a system, cause the system to perform operations for providing canonical content items. An example machine-readable medium may comprise instructions for receiving an online question by an asking user. The machine-readable medium may further comprise instructions for identifying one or more topics of the received online question. The machine-readable medium may further comprise instructions for matching at least one canonical content item from a plurality of canonical content items to the received online question based on the identified one or more topics, wherein each canonical content item of the plurality of canonical content items is associated with a model explanation of a topic. In addition, the machine-readable medium may comprise instructions for providing the matched at least one canonical content item to the asking user.

These and other aspects may include several advantages including, but not limited to, connecting an asking user of an online question with one or more canonical content items that provide a model explanation of a particular topic, for example, in a question and answer format to provide real-time answers to the asking user's online question.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, well-known structures and components are shown in block diagram form in order to avoid obscuring the concepts of the subject technology.

In accordance with various aspects of the subject technology, the present disclosure describes techniques for selecting or creating canonical content items (e.g., canonical questions and answers) and providing canonical content items of the canonical question portions thereof to a user's asking an online question. For example, a user of a system (e.g., social networking system or service, searching system or service, email system or service, mapping system or service, etc.) may have a question to which he or she would like an answer. In some instances, the question may have previously been asked and answered by other users, particularly for a system or service that includes a large number of users. However, a problem that generally prohibits using such previously asked questions and corresponding answers to help a present user, is that many users have difficulty in formulating online search queries and generally ask poorly-worded online questions.

Recognizing that user growth and technological advancements in various networks may result in new and existing users that are not be fluent with certain technologies or online searching processes, aspects of the subject technology may connect a user attempting to ask a question with a canonical content item (e.g., an audio file or video clip) or several canonical content items that expertly state and answer the asking user's question. In this regard, methods are provided for utilizing canonical content items in systems or services that employ expert-interest graphs or relationships, for example. Accordingly, such expert-interest graphs may be merged with advanced search technologies to provide expert information to many users of a system or service.

Figure 1:
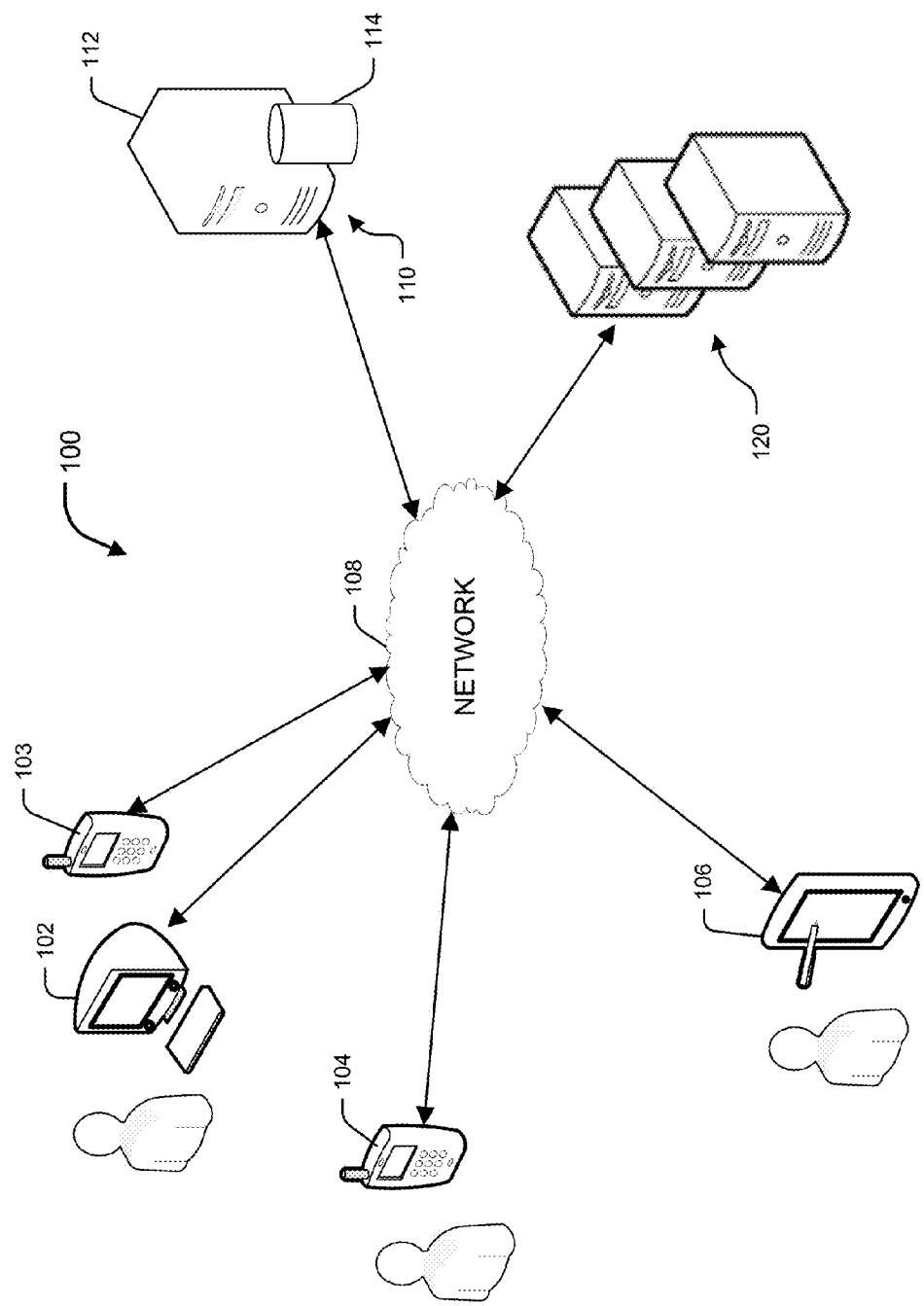
FIG. 1 illustrates an example client-server network environment for supporting real-time network interaction technologies in accordance with various aspects of the subject technology.

FIG. 1 illustrates an example client-server network environment which may support real-time network interaction technologies and be used to implement various techniques for creating and providing canonical content items. Network environment 100 may include a number of electronic devices 102, 103, 104, 106 communicably connected to server 110, such as by network 108. In other examples, electronic devices 102, 103, 104, 106 may be communicably connected to one another, such as by network 108, but not communicably connected to server 110. In some examples, the server 110 may host a question answering system or service.

Each of the one or more remote servers 120 can be a single computing device such as a computer server or can represent more than one computing device working together to perform the actions of a server computer (e.g., cloud computing). Each of the one or more remote servers 120 may host one or more systems or services including but not limited to user profile and activity data such as historical question and answering data, expertise and interest information, and network activity information, or may host one or more applications for maintaining analytics information regarding such user profiles and aspects with respect one or more systems or services.

Network 108 may be a public communication network, a private communications network, or a combination of both. In certain examples, network 108 can include any one or more of a personal area network (PAN), a local area network (LAN), a campus area network (CAN), a metropolitan area network (MAN), a wide area network (WAN), a broadband network (BBN), the Internet, and the like. Further, network 108 can include, but is not limited to, any one or more of the following network topologies, including a bus network, a star network, a ring network, a mesh network, a star-bus network, tree or hierarchical network, and the like.

Network 108 may be a public communication network (including, but not limited to, the Internet, cellular data network, cable data network, or dialup modems over a public switched telephone network) or a private communications network (such as, for example, private local area network ("LAN") or leased-line network). Network 108 may also include, but is not limited to, any one or more of the following network topologies, including a bus network, a star network, a ring network, a mesh network, a star-bus network, a tree or hierarchical network, and the like.

In some implementations, electronic devices 102, 103, 104 and 106 can be computing devices such as laptop or desktop computers, smartphones, personal digital assistants ("PDAs"), portable media players, tablet computers, televisions or other displays with one or more processors coupled thereto or embedded therein, or other appropriate computing devices that can be used to for displaying a web page or web application. In the example of FIG. 1, electronic device 102 is depicted as a desktop computer, electronic devices 103, 104 are depicted as smartphones, and electronic device 106 is depicted as a tablet device.

In certain examples, server 110 includes one or more processing devices 112 and data store 114. The one or more processing devices 112 may execute computer instructions stored in data store 114, for example, to create and index canonical content items, and provide canonical content items to one or more of electronic devices 102, 103, 104, 106. Data store 114 may store the computer instructions on non-transitory computer-readable medium.

In certain examples, server 110 may be a single computing device such as a computer server. In other examples, server 110 may represent more than one computing device working together to perform the actions of a server computer (e.g., a cloud of computers or a distributed system). In another example, server 110 may be coupled with various databases, storage services, or other computing devices. Server 110 and the coupled databases, storage services, or other computing devices may be collocated, or may be disparately located.

Communications between electronic devices 102, 103, 104, 106, and server 110 may be facilitated through the Hypertext Transfer Protocol ("HTTP") communication protocol. Other communication protocols may also be used including, for example, Extensible Messaging and Presence Protocol (XMPP) communication, for some or all communications between electronic devices 102, 103, 104, 106 and server 110. In other examples, electronic devices 102, 103, 104, 106 may be in communication with one another without communicating with server 110.

A user interacting with a client device (e.g., electronic devices 102, 103, 104, or 106) may perform one or more activities with respect to his or her profile at a system or service (e.g., a service hosted at one or more remote servers 120). Question answering system (e.g., hosted at server 110) may receive information regarding interactions of one or more other users of the service (e.g., users interacting with one or more client devices) with respect to the activity of both question asking users and answering users, and may analyze the interactions to provide various ranking and routing decisions, for example.

The phrase "online question" as used herein encompasses its plain and ordinary meaning including but not limited to a message communicating at least one question from at least one of electronic devices 102, 103, 104, 106, where each electronic device 102, 103, 104, 106 may transmit text, audio, or video streams. Additionally, each electronic device 102, 103, 104, 106 may receive text, audio, or video streams from the server 110, one or more remote servers 120, or at least one other of electronic devices 102, 103, 104, 106 in response to the online question. Accordingly, electronic devices 102, 103, 104, 106, may include, or may be coupled to, a microphone, camera, or other device for capturing audio or video, and may include an output device for providing text, audio, or video.

In operation, server 110 (alone or in conjunction with servers 120) may provide and process algorithms or operations for creating and providing canonical content items from and to users of electronic devices 102, 103, 104, 106 such as by hosting a question answering system. Electronic devices 102, 103, 104, 106 may each establish a communications with server 110 or servers 120, for purposes of participating in the question answering system or service. A user interacting with one of electronic devices 102, 103, 104, 106, such as electronic device 106, may transmit a request to server 110 indicating that the user would like to ask an online question. In response to receiving an online question from electronic device 106, server 110 may transmit a request to a user interacting with one of electronic devices 102, 103, 104, 106, such as electronic device 106, indicating whether the user would like to select one of a number of asked questions portions of canonical content items that may more precisely state the question that the user is attempting to ask.

In certain examples, server 110 or servers 120 may route the online question to one or more candidate answering users of the question answering system if none of the asked questions portions of canonical content items appeal to the asking user. Server 110 or servers 120 may continually determine the state and activity of electronic devices 102, 103, 104 of each of the candidate answering users in order to re-rank users and reroute the online question. Methods for creating and providing canonical content items are further described below with respect to FIGS. 2-4 and continued reference to FIG. 1.

Figure 2:
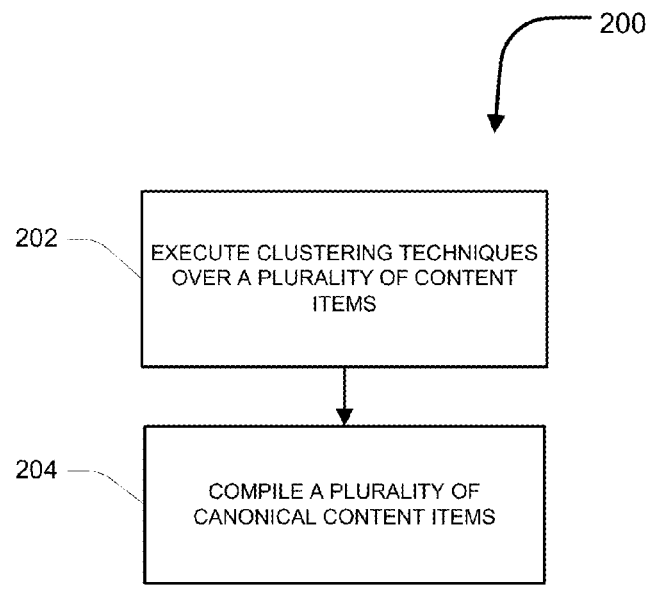
FIG. 2 is a flow diagram illustrating an example method for creating canonical content items in accordance with various aspects of the subject technology.

FIG. 2 illustrates a flow diagram of an example method for creating canonical content items. It is to be understood that the operations in method 200 may be used in conjunction with other methods and aspects of the present disclosure. Although method 200 is described with relation to system of FIG. 1, method 200 is not limited to such. In method 200, hosting device, such as server 110, may provide a question answering system or service to one or more participant devices, including but not limited to electronic devices 102, 103, 104, 106, by which users have previously asked questions and answered questions. For the explanatory purposes, electronic devices 102, 103, 104 may be associated with users who have previously answered numerous online questions. Each of the electronic devices 102, 103, 104, 106 may establish an individual multimedia session with server 110 and servers 120.

In block 202, server 110 (alone or in conjunction with one or more remote servers 120) may execute one or more clustering techniques over a plurality of content items. For example, some content items may include an asked question and one or more corresponding answers from various users (e.g., electronic devices 102, 103, 104). The clustering techniques may search through historical data related the content items to identify potential canonical content items.

In block 204, a plurality of canonical content items can be compiled based on a curating process or the like. The curating process may include analyzing the clustered sets of content items indexed by topics, subtopics, etc., and identifying or procuring canonical content items therefrom. In addition to selecting canonical content items algorithmically, it is to be appreciated that human curators or operators may be used curating process to aid in clustering related content items or selecting the canonical content items.

To this end, a database of canonical content items may be created and maintained in server 110 (alone or in conjunction with one or more remote servers 120) so that the canonical content items can be provided to future asking users of online questions. It is to be understood that each canonical content item may be associated with a model explanation of a topic or subtopic, for example. Various forms of expression may be utilized in providing the model explanation. For example, textual documents, graphical illustrations, audio file, video clips, or other media items may constitute the model explanation of a canonical content item.

Additionally, the model explanation of a canonical content item may be presented in the form of a well-articulated question followed by a high-quality, informative response answering the question. Modeling the information seeking needs of the plurality of users using a canonical question based model, for example, can improve the quality of answers provided by an expert graph question answering system as well as provide known standard pivots through archives of supplied user-submitted answers.

Figure 3:
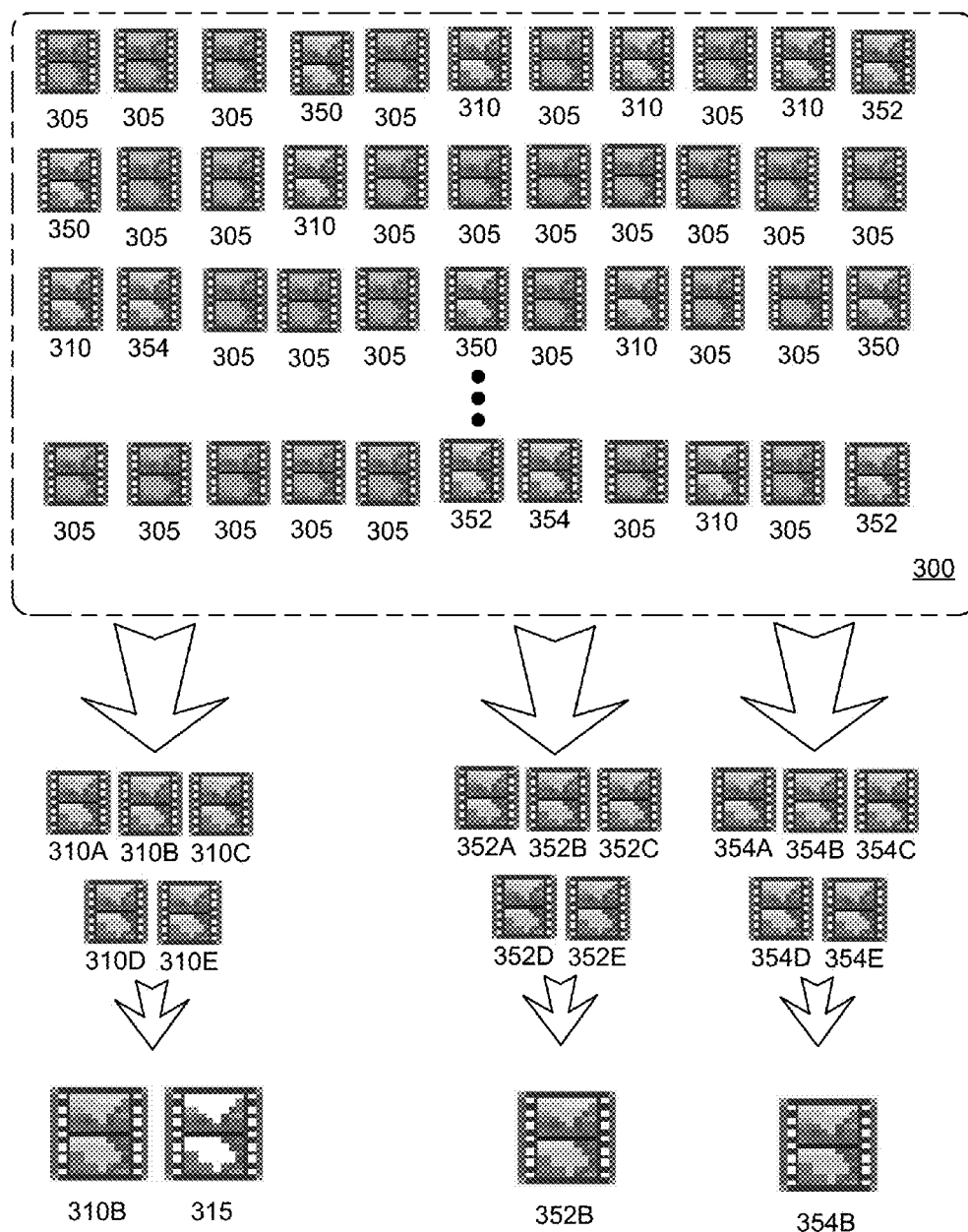
FIG. 3 is a diagram illustrating example techniques for creating canonical content items in accordance with various aspects of the subject technology.

FIG. 3 is a diagram illustrating example techniques for selecting and creating canonical content items. According to aspects of the subject technology, a plurality of content items 300 may be processed using one or more clustering techniques as discussed above in method 200. It is to be appreciated that in some systems or services, there may be 15,000 or more users that actively answer questions thereby generating a large number of content items. A pattern may emerge identifying a set of similar content items 310 from the multitude of other content items 305 in the plurality of content items 300. Thus, the plurality of content items 300 may be identified and grouped into a set of similar content items 310.

In some examples, each of the similar content items 310 may be related to a similar user-question and user-answer pair. For example, questions may be clustered for which each question has been asked in a different manner, but with synonymous words or phrases that basically are referring to the same question or topic. Then, the set of similar content items 310 may be analyzed such that content items deemed to be of lesser importance may be filtered from the set of content items.

To this end, the curating process may include utilizing various filtering techniques to determine the representative content item of like content items. In some implementations, a human curator's further analysis and selection may be used in conjunction with the various clustering and filtering techniques in determining the representative content item. A cluster of similar content items 310a, 310b, 310c, 310d, 310e may be identified as the most relevant of the identified similar content items 310 associated with a topic. The curating process may further include selecting a content item 310b from the cluster as a canonical content item as representative of the identified similar content items 310. Therefore, in addition to selecting canonical content items (or the canonical question portion of the canonical content item) algorithmically human curators or operators can be used to help select the canonical content items. Some of the canonical content items that make up the plurality of canonical content items may be selected in this manner.

According to other aspects, the curating process may include creating at least some canonical content items by synthesizing the cluster of similar content items 310a, 310b, 310c, 310d, 310e into a single content item 315. In this regard, the curating process may include determining a set of above-average content items related to a topic, and then creating a new, single content item 315 from that set of content items. This content item 315 derived from the cluster of similar content items 310a, 310b, 310c, 310d, 310e may then be used as a canonical content item presented to an asking user.

Other aspects of the curing process may include rating the entirety of similar content items 310 or the cluster of similar content items 310a, 310b, 310c, 310d, 310e to derive a canonical content item for the topic associated with the entirety of similar content items 310. For example, ratings of past answers to previously asked questions may be utilized to determine a preferred answer to identify as an answer portion of a canonical content item having a question and answer format.

Similarly, a proficiency valuation associated with answering user receiving high ratings in a one or more subject areas may be determined and incorporated in an expert-interest graph or relationship included as part of a question answering system or service. In some implementations, answering users with high proficiency valuations may have their subsequent answers expedited in the curating process, for example. In some aspects, cohesive communication factors are incorporated in the selection process, thereby favoring content items that are provide well-presented and easily understood questions and answers.

In accordance with other aspects of the subject technology, a set of related canonical content items 352b, 354b may be selected from the plurality of content items 300 as further illustrated in FIG. 3. In this regard, each canonical content item of the set of related canonical content items 352b, 354b may be created by disparate entities, content providers, organizations, or the like. It is to be appreciated that multiple disparate entities may have an interest in providing a different answer or response to the same question, and may provide multiple viewpoints on the particular topic.

For example, similar content items 350, 352, 354 may all related to the same topic. Content items 350 may originate from general users, content items 352 may originate from ABC Co., and content items 354 may originate from XYZ Co. A cluster of similar content items 352a, 352b, 352c, 352d, 352e from ABC Co. may be identified and content item 352b may be selected from the cluster as a canonical content item that is representative of ABC Co.'s content items 352 of the identified similar content items 350, 352, 354. Similarly, a cluster of similar content items 354a, 354b, 354c, 354d, 354e from XYX Co. may be identified and content item 354b may be selected from the cluster as a canonical content item that is representative of the XYZ Co.'s content items 354 of the identified similar content items 350, 352, 354.

In other examples, a representative or concierge for ABC Co. may be provided a set of canonical questions that could be seen to answer various common questions that an online asking user may have. Each canonical question may be linked or associated with a preferred answer provided by ABC Co. This process may be similarly repeated by a representative or concierge for XYZ Co. and other entities. It is to be understood that the preferred answer may or may not be ranked as a best answer across the total of answer provided by all answering entities 350, 352, 354, for example.

Accordingly, each disparate entity may have a different answer to such a canonical question, and the associated canonical content items may be stored in an expert-interest graph or relationship of a question answering system or service. In this regard, several subjective canonical content items may be provided as answers to the online question by the asking user. Accordingly, the asking user may be presented with canonical questions from several entities, for example, ABC Co.'s canonical content item 352b and XYZ Co.'s canonical content item 354b when asking an online question related to a given topic. The asking user may then select one or more of the canonical content items 352b, 354b, presented to the asking user. In other implementations, an aggregated canonical content item may include a single canonical asked question portion with a plurality of corresponding answer portions by the disparate entities.

Figure 4:
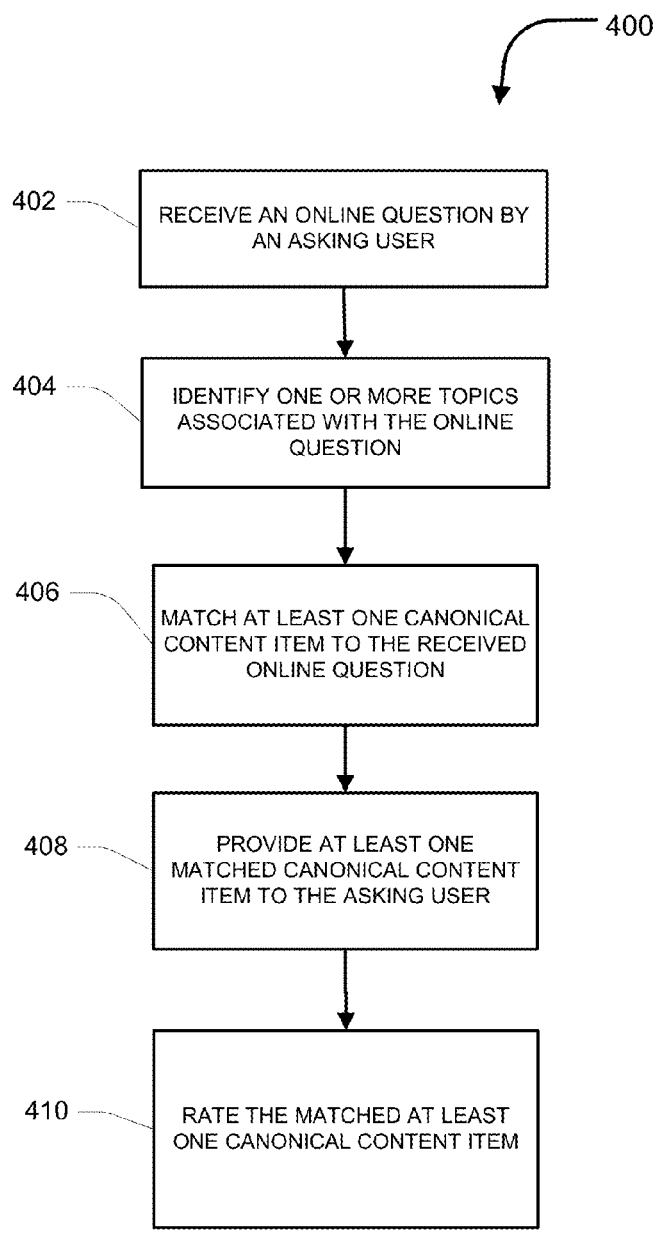
FIG. 4 is a flow diagram illustrating an example method for providing canonical content items in response to an online question in accordance with various aspects of the subject technology.

FIG. 4 is a flow diagram illustrating an example method for providing canonical content items in response to an online question. It is to be understood that the operations in method 400 may be used in conjunction with other methods and aspects of the present disclosure. Although method 400 is described with relation to system of FIG. 1, method 400 is not limited to such.

In method 400, hosting device, such as server 110, may provide a question answering system or service to one or more participant devices, including but not limited to electronic devices 102, 103, 104, 106. For the explanatory purposes, electronic devices 102, 103, 104 may be associated with users who have previously answered numerous online questions, and electronic device 106 may be associated with an asking user (e.g., the user who is asking an online question and to be provided canonical content items). The answering user may also be connected directly to other users of the question answering system or service. Each of the electronic devices 102, 103, 104, 106 may establish an individual multimedia session with server 110 and servers 120.

In block 402, an online question by an asking user may be received by server 110. In block 404, one or more topics or characteristics associated with the online question may be identified. In this regard, the online question may be parsed into one or more phrases or compared with model questions for similarities such that one or more topics or subtopics may be identified. For example, the online question by the asking user (e.g., electronic device 106) may include a phrase such as "Which car has the best safety features?" so that it can be determined that the online question pertains to automobiles and automobile safety aspects, as opposed to automobile performance aspects, for instance.

In block 406, at least one canonical content item may be matched to the received online question based on the identified one or more topics. The at least one canonical content item may be selected from a database (e.g., a database associated with server 110 or servers 120) having a plurality of canonical content items stored therein. In some examples, each canonical content item of the plurality of canonical content items may be associated with a model explanation of a topic. The model explanation of each canonical question may include an asked question portion and corresponding answer portion. In some implementations, the content related to the question portion may be separately accessed and provided from the content related to the corresponding answer portion of the canonical content item.

In block 408, the matched at least one canonical content item may be provided to the asking user (e.g., electronic device 106). In some examples, a group of matched canonical content items may be provided to the asking user. For example, when the model explanation includes an asked question portion and corresponding answer portion, the asked question portion of each of the group of matched canonical content items may first be provided to the asking user. The asking user may then select the one of the provided asked question portions of the group of matched canonical content items that best represents the asking user's online question. Next, the corresponding answer portion of the indicated one of the provided asked question portions of the group of matched canonical content items may be provided to the asking user.

In other examples, a set of related canonical content items may be provided to the asking user. Each canonical content item of the set may be associated with a different entity. The asking user may then be presented with the set of the related canonical content items and may select one or more of the set.

In some instances, none of matched canonical content items may appeal the asking user. In this regard, the system may inquire whether the asking user would like to connect with another user (e.g., electronic devices 102, 103, 104) to have the online question answered. The online question may be routed to a user to be answered based on a ranked set of candidate answering users.

Ranking the candidate answering users, as well as routing the online question to one or more candidate answering users, may be based on a variety of aspects such as, but not limited to, the candidate answering user's present search engagement status (e.g., whether the user is actively engaged in a search task), present location (e.g., whether the user is at home, commuting, at work, or waiting in line), search savvyness (e.g., a user's ability to effectively conduct an online search), recent similar search experience (e.g., recently-acquired relevant search experience in a topic similar to the asking user), expertise level, or a combination thereof.

In block 410, the asking user may provide a rating of the matched at least one canonical question. The rating may identify the asking user's approval of the model explanation of the topic that is associated with the matched canonical question. In some implementations, the rating information may be used as a factor in the curating process associated with one or more clusters of content items. Such rating information obtained from multiple asking users can be used in maintaining the database having the plurality of canonical content items, for example.

Figure 5:
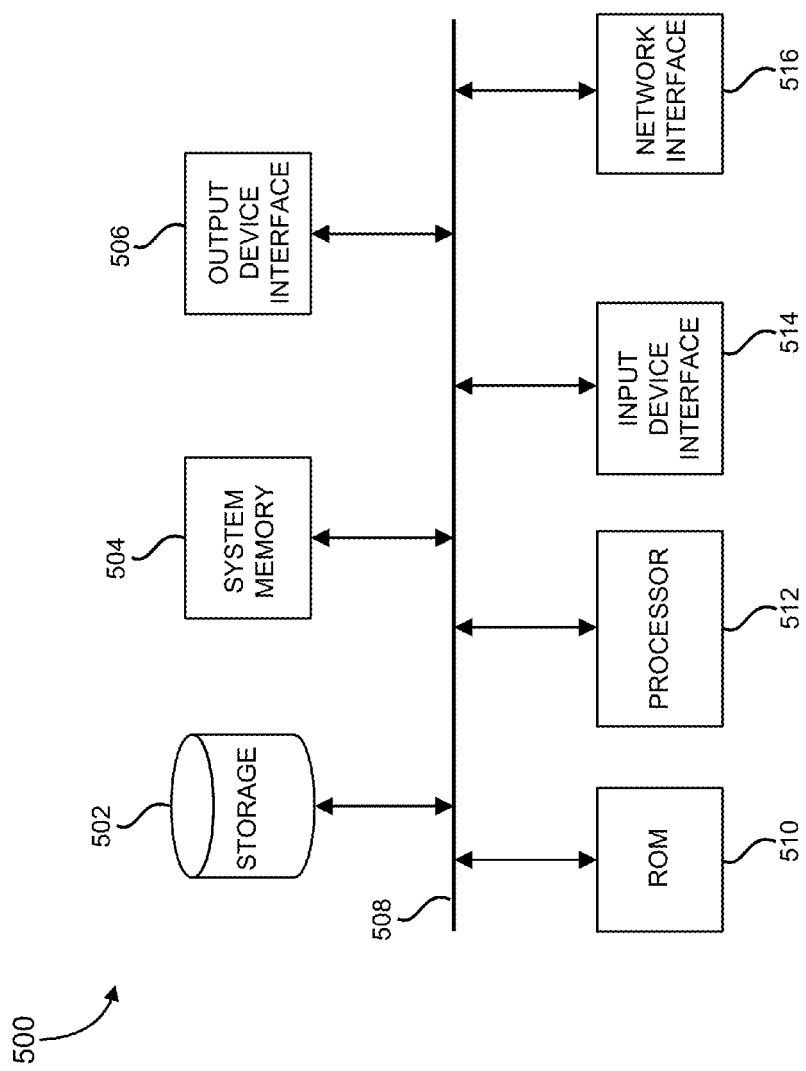
FIG. 5 conceptually illustrates an electronic system with which some aspects of the subject technology are implemented.

FIG. 5 conceptually illustrates an electronic system with which some implementations of the subject technology are implemented. Electronic system 500 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units may include instructions for processing, ranking, and routing online questions in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

What is claimed is:
1. A computer-implemented method comprising:
receiving, at a server, an online question by an asking user from a user device of the asking user over a communications network;

identifying, with the server, one or more topics of the received online question;

matching, with the server, at least one canonical content item from a plurality of canonical content items to the received online question based on the identified one or more topics, wherein each canonical content item of the plurality of canonical content items includes a model explanation of a topic stored at the server, wherein each model explanation comprises an asked question portion and a corresponding answer portion, and wherein each canonical content item is based on a set of similar content items from a plurality of content items;

providing, to the user device over the communications network, the asked question portion and the corresponding answer portion of the matched at least one canonical content item to the asking user;

executing one or more clustering techniques over the plurality of content items to determine each set of similar content items, wherein the plurality of content items relates to user-submitted online questions and corresponding user-submitted online answers;

compiling the plurality of canonical content items based on a curating process associated with one or more clusters of content items from each set of similar content items from the plurality of content items; and receiving a rating, by the asking user, for the matched at least one canonical content item, wherein the rating identifies the asking user's approval of the model explanation of the topic associated with the matched at least one canonical content item and is used as a factor in the curating process associated with one or more clusters of content items.

2. The method of claim 1, wherein the curating process comprises selecting at least some canonical content items of the plurality of canonical content items by selecting a representative content item from the one or more clusters of content items.

3. The method of claim 1, wherein the curating process comprises selecting at least some canonical content items of the plurality of canonical content items by synthesizing a set of content items from the one or more clusters of content items into a single content item.

4. The method of claim 1, wherein the matched at least one canonical content item comprises a group of matched canonical content items and the providing the matched at least one canonical content item to the asking user comprises:

providing the asked question portion of each of the group of matched canonical content items to the asking user;

receiving a selection by the asking user indicating one of the provided asked question portions of the group of matched canonical content items; and providing the corresponding answer portion of the indicated one of the provided asked question portions of the group of matched canonical content items.

5. The method of claim 1, wherein the at least one canonical content item comprises a video clip that presents the asked question portion and the corresponding answer portion.

6. The method of claim 1, wherein the at least one canonical content item comprises a set of related canonical content items, and wherein each canonical content item of the set of related canonical content items is associated with a different entity.

7. A system comprising:
one or more processors; and
a memory including instructions that, when executed by the one or more processors, cause the one or more processors to:

receive an online question by an asking user;

identify one or more topics of the received online question;

match at least one canonical content item from a plurality of canonical content items to the received online question based on the identified one or more topics, wherein each canonical content item of the plurality of canonical content items includes a model explanation of a topic, wherein each model explanation comprises an asked question portion and a corresponding answer portion, and wherein each canonical content item is based on a set of similar content items from a plurality of content items;

provide the asked question portion and the corresponding answer portion of the matched at least one canonical content item to the asking user;

execute one or more clustering techniques over the plurality of content items to determine each set of similar content items, wherein the plurality of content items relates to user-submitted online questions and corresponding user-submitted online answers;

compile the plurality of canonical content items based on a curating process associated with one or more clusters of content items from each set of similar content items from the plurality of content items; and receive a rating, by the asking user, for the matched at least one canonical content item, wherein the rating identifies the asking user's approval of the model explanation of the topic associated with the matched at least one canonical content item and is used as a factor in the curating process associated with the one or more clusters of content items.

8. The system of claim 7, wherein the matched at least one canonical content item comprises a group of matched canonical content items and wherein the instructions that, when executed by the one or more processors, cause the one or more processors to provide the matched at least one canonical content item to the asking user, further cause the one or more processors to:

provide the asked question portion of each of the group of matched canonical content items to the asking user;

receive a selection by the asking user indicating one of the provided asked question portions of the group of matched canonical content items; and provide the corresponding answer portion of the indicated one of the provided asked question portions of the group of matched canonical content items.

9. A machine-readable medium comprising instructions stored therein, which when executed by a machine, cause the machine to perform operations, the machine-readable medium comprising:

instructions for receiving an online question by an asking user;

instructions for identifying one or more topics of the received online question;

instructions for matching at least one canonical content item from a plurality of canonical content items to the received online question based on the identified one or more topics, wherein each canonical content item of the plurality of canonical content items includes a model explanation of a topic, wherein each model explanation comprises an asked question portion and a corresponding answer portion, and wherein each canonical content item is based on a set of similar content items from a plurality of content items;

instructions for providing the asked question portion and the corresponding answer portion of the matched at least one canonical content item to the asking user;

instructions for executing one or more clustering techniques over the plurality of content items to determine each set of similar content items, wherein the plurality of content items relates to user-submitted online questions and corresponding user-submitted online answers;

instructions for compiling the plurality of canonical content items based on a curating process associated with one or more clusters of content items from each set of similar content items from the plurality of content items; and instructions for receiving a rating, by the asking user, for the matched at least one canonical content item, wherein the rating identifies the asking user's approval of the model explanation of the topic associated with the matched at least one canonical content item and is used as a factor in the curating process associated with the one or more clusters of content items.

10. The machine-readable medium of claim 9, wherein the matched at least one canonical content item comprises a group of matched canonical content items and wherein the instructions for providing the matched at least one canonical content item to the asking user further comprise:

instructions for providing the asked question portion of each of the group of matched canonical content items to the asking user;

instructions for receiving a selection by the asking user indicating one of the provided asked question portions of the group of matched canonical content items; and instructions for providing the corresponding answer portion of the indicated one of the provided asked question portions of the group of matched canonical content items.

11. The system of claim 7, wherein the instructions, when executed by the one or more processors, further cause the one or more processors to perform the curating process by selecting at least some canonical content items of the plurality of canonical content items by selecting a representative content item from the one or more clusters of content items.

12. The system of claim 7, wherein the instructions, when executed by the one or more processors, further cause the one or more processors to perform the curating process by selecting at least some canonical content items of the plurality of canonical content items by synthesizing a set of content items from the one or more clusters of content items into a single content item.

13. The system of claim 7, wherein the at least one canonical content item comprises a video clip that presents the asked question portion and the corresponding answer portion.

14. The system of claim 7, wherein the at least one canonical content item comprises a set of related canonical content items, and wherein each canonical content item of the set of related canonical content items is associated with a different entity.

15. The machine-readable medium of claim 9, further comprising instructions for performing the curating process by selecting at least some canonical content items of the plurality of canonical content items by selecting a representative content item from the one or more clusters of content items.

16. The machine-readable medium of claim 9, further comprising instructions for performing the curating process by selecting at least some canonical content items of the plurality of canonical content items by synthesizing a set of content items from the one or more clusters of content items into a single content item.

17. The machine-readable medium of claim 9, wherein the at least one canonical content item comprises a video clip that presents the asked question portion and the corresponding answer portion.

18. The machine-readable medium of claim 9, wherein the at least one canonical content item comprises a set of related canonical content items, and wherein each canonical content item of the set of related canonical content items is associated with a different entity.

* * * * *